(12) United States Patent
Voellmar et al.

(10) Patent No.: US 9,914,792 B2
(45) Date of Patent: Mar. 13, 2018

(54) ETHYLENE-PROPYLHEPTYL(METH-)ACRYLATE COPOLYMERS

(71) Applicant: BASF SE, Ludwigshafen (DE)

(72) Inventors: Helmuth Voellmar, Mannheim (DE); Maria Heuken, Schwarzheide (DE); Dawid Marczewski, Limburgerhof (DE); Marvin Karos, Plankstadt (DE); Ivette Garcia Castro, Ludwigshafen (DE); Claudia Wood, Weinheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/525,084

(22) PCT Filed: Nov. 9, 2015

(86) PCT No.: PCT/EP2015/076039
§ 371 (c)(1),
(2) Date: May 8, 2017

(87) PCT Pub. No.: WO2016/075070
PCT Pub. Date: May 19, 2016

(65) Prior Publication Data
US 2017/0335033 A1  Nov. 23, 2017

(30) Foreign Application Priority Data
Nov. 10, 2014 (EP) .................... 14192468

(51) Int. Cl.
*C08F 210/02* (2006.01)
*C08F 218/08* (2006.01)

(52) U.S. Cl.
CPC .......... *C08F 210/02* (2013.01); *C08F 218/08* (2013.01)

(58) Field of Classification Search
CPC ............ C08F 2220/1875; C08F 218/08; C08F 210/02
See application file for complete search history.

(56) References Cited

U.S. PATENT DOCUMENTS

| | | | |
|---|---|---|---|
| 2,628,187 A | 2/1953 | Frohmader et al. | |
| 3,215,599 A | 11/1965 | Thau et al. | |
| 4,009,139 A | 2/1977 | Widder et al. | |
| 4,126,144 A | 11/1978 | Duarte | |
| 6,132,705 A | 10/2000 | Schehlmann et al. | |
| 6,664,356 B1 | 12/2003 | Shih | |
| 8,338,344 B2 | 12/2012 | Maehling et al. | |
| 2007/0218089 A1 | 9/2007 | Dyllick-Brenzinger et al. | |
| 2010/0048439 A1* | 2/2010 | Maehling ............. | C08F 210/02 508/469 |
| 2011/0136967 A1 | 6/2011 | Mahling et al. | |
| 2012/0005951 A1* | 1/2012 | Mahling ................. | C08F 8/14 44/388 |

FOREIGN PATENT DOCUMENTS

| | | |
|---|---|---|
| CA | 2804376 A1 | 1/2012 |
| EP | 1 634 578 A1 | 3/2006 |
| EP | 1 923 454 A1 | 5/2008 |
| WO | WO-2007/135038 A1 | 11/2007 |
| WO | WO-2012/004240 A2 | 1/2012 |
| WO | WO-2012004240 A2 * | 1/2012 ................ C08F 8/14 |

OTHER PUBLICATIONS

International Preliminary Report on Patentability for PCT Patent Application No. PCT/EP2015/076039, dated May 26, 2017 (6 pages).
International Search Report and Written Opinion for PCT Patent Application No. PCT/EP2015/076039, dated Jan. 19, 2016 (9 pages).

* cited by examiner

*Primary Examiner* — Vu A Nguyen
(74) *Attorney, Agent, or Firm* — Marshall, Gerstein & Borun LLP

(57) ABSTRACT

The present invention relates to copolymers which are formed from specific amounts of (a) ethylene and (b) monomer(s) selected from propylheptylacrylate and propylheptyl-methacrylate, and optionally at least one further monomer. Said copolymers are useful as oil soluble additives for cosmetic formulations and especially oil depositioning enhancers for rinse-off formulations.

9 Claims, No Drawings

ETHYLENE-PROPYLHEPTYL(METH-)ACRYLATE COPOLYMERS

CROSS-REFERENCE TO RELATED APPLICATIONS

This application is the U.S. National Stage application of International Patent Application No. PCT/EP2015/076039, filed Nov. 9, 2015, which claims the benefit of European Patent Application No. 14192468.8, filed Nov. 10, 2014.

The invention relates to copolymers which comprise, in copolymerized form, ethylene and at least one propylheptylester of acrylic or methacrylic acid. Said copolymers are useful as oil soluble additives for cosmetic formulations and especially as oil depositioning enhancers for rinse-off formulations.

Oil soluble additives in cosmetic formulations are less common than water soluble additives.

Most non-water soluble additives exist only in dispersed form. Examples of such additives include polymers obtained via o/w emulsion (co-)polymerization such as styrene-butadiene copolymers (cf., e.g., U.S. Pat. No. 4,009,139), polyacrylates (cf., e.g., U.S. Pat. No. 6,132,705, US 2007/0218089), acrylate-vinylacetate copolymers, acrylate-styrene-butadiene copolymers and vinylacetate-ethylene copolymers (cf., e.g., U.S. Pat. No. 4,126,144, EP 1634578). These kinds of polymers usually are only be used in aqueous formulation and not applied in cases, where a pure solution of oil and additive is needed, because attempts to prepare a solution in oil by drying processes are costly and can cause crosslinking.

Others additives can exist in pure form and can be used directly as additive for oil-containing cosmetic formulations. Examples of such additives include polyacrylates (cf., e.g., U.S. Pat. No. 6,664,356) and ethylene homopolymers (cf., e.g., U.S. Pat. Nos. 2,628,187, 3,215,599). However, liquid solutions of such additives in oils often exhibit poor stability.

Thus, there is a need for additives which are readily soluble in oils, form homogenous liquid oil solutions which are stable against phase separation and the formation of inhomogeneities, and are useful in oil-containing liquid cosmetic formulations. It was therefore on object of the present invention to provide such additives.

Surprisingly, it has been found that this object was achieved by the copolymers of the present invention which are formed from monomers comprising ethylene and a branched alkyl(meth-)acrylate having properties as described below.

Polymers comprising monomeric units derived from ethylene and branched acrylates are described as cold flow improvers for fuels and impact modifiers in, e.g., U.S. Pat. No. 8,338,344, WO 2012/004240 and WO 2007/135038.

The present invention provides copolymers formed from monomers
(a) ethylene,
(b) at least one monomer selected from propylheptylacrylate, propylheptylmethacrylate and mixtures thereof, and
(c) optionally at least one further monomer that is/are different from (a) and (b), wherein
(i) the amount of ethylene monomers (a) is in the range of from 75 wt-% to 98 wt-% relative to total weight of monomers forming the copolymer;
(ii) the total amount of monomers (a) plus (b) is at least 90 wt-% relative to the total weight of monomers forming the copolymer; and
(iii) the amount by weight of monomer(s) (c), if present, is smaller than the amount by weight of monomer(s) (b).

Unless stated otherwise, the following general definitions apply in the context of the present invention:

$C_1$-$C_3$-Alkyl is a straight-chain or branched alkyl group having from 1 to 3 carbon atoms. Examples of $C_1$-$C_3$-alkyl groups are methyl, ethyl, n-propyl and isopropyl.

$C_1$-$C_4$-Alkyl is a straight-chain or branched alkyl group having from 1 to 4 carbon atoms. Examples of $C_1$-$C_4$-alkyl groups are methyl, ethyl, n-propyl, isopropyl, n-butyl, 2-butyl, isobutyl and tert-butyl.

$C_1$-$C_9$-Alkyl is a straight-chain or branched alkyl group having from 1 to 9 carbon atoms. Examples of $C_1$-$C_9$-alkyl groups include methyl, ethyl, n-propyl, isopropyl, n-butyl, 2-butyl, isobutyl, tert-butyl, pentyl, neopentyl, hexyl, heptyl, octyl, 2-ethylhexyl, nonyl, and their constitutional isomers.

$C_1$-$C_{20}$-Alkyl is a straight-chain or branched alkyl group having from 1 to 20 carbon atoms. Examples of $C_1$-$C_{20}$-alkyl groups include methyl, ethyl, n-propyl, isopropyl, n-butyl, 2-butyl, isobutyl, tert-butyl, pentyl, neopentyl, hexyl, heptyl, octyl, 2-ethylhexyl, nonyl, decyl, 2-propylheptyl, 4-methyl-2-propylhexyl, undecyl, dodecyl (e.g. lauryl), tridecyl, tetradecyl (e.g. myristyl), pentadecyl, hexadecyl, heptadecyl, octadecyl (e.g. stearyl), nonadecyl, eicosyl and their constitutional isomers.

$C_1$-$C_{20}$-Alkoxy is a group of formula —O—R, wherein R is a straight-chain or branched $C_1$-$C_{20}$-alkyl group as described herein. Examples of $C_1$-$C_{20}$-alkoxy groups include methoxy, ethoxy, propoxy, isopropoxy, n-butoxy, 2-butoxy, isobutoxy (2-methylpropoxy), tert-butoxy, pentoxy, 1-methylbutoxy, 2-methylbutoxy, 3-methylbutoxy, 2,2-dimethylpropoxy, 1-ethylpropoxy, hexoxy, 1,1-dimethylpropoxy, 1,2-dimethylpropoxy, 1-methylpentoxy, 2-methylpentoxy, 3-methylpentoxy, 4-methylpentoxy, 1,1-dimethylbutoxy, 1,2-dimethylbutoxy, 1,3-dimethylbutoxy, 2,2-dimethylbutoxy, 2,3-dimethylbutoxy, 3,3-dimethylbutoxy, 1-ethylbutoxy, 2-ethylbutoxy, 1,1,2-trimethylpropoxy, 1,2,2-trimethylpropoxy, 1-ethyl-1-methylpropoxy, 1-ethyl-2-methylpropoxy, heptoxy, octoxy, 2-ethylhexoxy, nonoxy, decoxy, 2-propylheptoxy, 4-methyl-2-propylhexoxy, undecoxy, dodecoxy, tridecoxy, tetradecoxy, pentadecoxy, hexadecoxy, heptadecoxy, octadecoxy, nonadecoxy, eicosoxy and their constitutional isomers fitting formula —O—R.

The alkyl and alkoxy groups can be unsubstituted or substituted. Substituted alkyl and alkoxy group carry one or more than one substituent selected from the group including, but not limited to, hydroxyl, $C_1$-$C_4$-alkoxy, —$NR^aR^b$ and carbonyl (—$C(O)R^a$), wherein $R^a$ and $R^b$ are each independently H or $C_1$-$C_4$-alkyl. In the context of the present invention, the term "alkyl" preferably refers to unsubstituted alkyl, and the term "alkoxy" preferably refers to unsubstituted alkoxy.

The propylheptylmethacrylate and propylheptylacrylate monomers used in the production of copolymers of the present invention are typically be prepared by an esterification with essentially pure 2-propylheptanol, or with a mixture of propylheptanol isomers as is typically obtained by the industrial production of 2-propylheptanol and usually also termed "2-propylheptanol".

Pure 2-propylheptanol can be prepared by aldol condensation of n-valeraldehyde and subsequent hydrogenation of the resulting 2-propylheptenal, e.g. as described in U.S. Pat. No. 2,921,089. In addition to the main constituent 2-propylheptanol, commercially available 2-propylheptanol generally contains isomers of 2-propylheptanol as by-products, such as 2-propyl-4-methylhexanol, 2-propyl-5-methylhexanol, 2-isopropyl-heptanol, 2-isopropyl-4-methylhexanol, 2-isopropyl-5-methylhexanol and/or 2-propyl-4,4-dimethylpentanol. Other isomers of 2-propylheptanol, such as 2-ethyl-2,4-dimethylhexanol, 2-ethyl-2-methyl-heptanol and/or 2-ethyl-2,5-dimethylhexanol can also be present.

For the production of 2-propylheptanol different carbohydrate sources can be used as starting materials, for example 1-butene, 2-butene, raffinate I (a alkane/alkene mixture obtained from the $C_4$-fraction of a crackers after separation of allenes, acetylenes and dienes that still contains, apart from 1- and 2-butene, significant amounts of isobutene) or raffinate II (obtained from raffinate I by separation of isobutene that contains, apart from 1- and 2-butene, only low amounts of residual isobutene). Of course, mixtures of raffinate I and raffinate II can be used as starting materials in the production of 2-propylheptanol. These olefins and olefin mixtures can be hydroformylated by methods known in art using cobalt or rhodium catalysts such that 1-butene is converted into a mixture of n-valeraldehyde and iso-valeraldehyde (2-methylbutanal), wherein the n/iso ratio can vary within a relatively wide range, depending on the catalyst and hydroformylation conditions applied. For example, when a triphenylphospine-modified homogenous rhodium catalyst (Rh/TPP) is used, generally the n/iso ratio of the formed n- and iso-valeraldehyde is in the range of from 10:1 to 20:1, whereas nearly exclusively n-valeraldehyde is formed when using rhodium catalysts modified with phosphite ligands (e.g. as described in U.S. Pat. No. 5,288,918 or WO 2005/028407) or phosphoamidite ligands (e.g. as described in WO 02/083695). The conversion of 2-butene by the Rh/TPP catalyst system is very slow such that the largest amount of the 2-butene can be recovered from the hydroformylation mixture. In contrast, the above-mentioned rhodium catalysts modified with phosphite ligands or phosphoramidite ligands allow an efficient hydroformylation of 2-butene, wherein mostly n-valeraldhyde is formed. Basically all catalyst systems result in a hydroformylation of the isobutene contained in the olefinic source materials into 2-methylbutanal and, depending on the catalyst, also small amounts of pivalaldehyde.

The $C_5$-hydroformylation product, i.e. n-valeraldehyde or a mixture thereof with isovaleraldehyde, 2-methylbutanal and/or pivaldehyde (depending on the starting materials and catalysts used), can be completely or partly separated into its single components prior to the aldol condensation reaction. This allows control of the isomer composition of the $C_{10}$-alcohol component of the ester monomer compositions used in the copolymers of the present invention. Alternatively, the $C_5$-hydroformylation product can be used in the aldol condensation reaction without prior separation of the individual isomers. Aldol condensation can be carried out in the presence of a basic catalyst such as an aqueous solution of sodium hydroxide or potassium hydroxide, e.g. as described in EP 0366089, U.S. Pat. Nos. 4,426,524 or 5,434,313. If n-valeraldehyde is used, aldol condensation yields 2-propylheptanal as essentially the only condensation product. If a mixture of $C_5$-aldehyde isomers is used, aldol condensation yields an isomer mixture of homocondensation products of same aldehyde molecules and the crossed condensation products of different $C_5$-aldehyde isomers. Of course, aldol condensation can be controlled by targeted conversion of individual isomers so as to form a single aldol condensation isomer as the major or essentially only product. The products of aldol condensation can be hydrogenated so as to form the corresponding alcohols or alcohol mixtures using hydrogenation catalysts known in the art (e.g. those mentioned above as being useful in the hydrogenation of aldehydes). Typically, said hydrogenation is performed after separation of the aldol condensation product from the reaction mixture (preferably by distillation) and, if desired, purification by distillation.

Where the propylheptylacrylate and propyl heptylmethacrylate monomers, respectively, forming the copolymer of the present invention are prepared from a mixture of 2-propylheptanol and isomers thereof (as mentioned above), the content of 2-propylheptanol in said mixture is generally at least 50 wt-%, in particular in the range of from 60 to 98 wt-%, preferably in the range of from 80 to 95 wt-%, and particularly preferred in the range of from 85 to 95 wt-% relative to the total weight of the isomer mixture.

Suitable mixtures of 2-propylheptanol and isomers thereof include, for example, mixtures comprising from 60 to 98 wt-% 2-propylheptanol, from 1 to 15 wt-% 2-propyl-2-methyl-hexanol, from 0.01 to 20.00 wt-% 2-propyl-5-methyl-hexanol and from 0.01 to 24.00 wt-% 2-isopropyl-heptanol, wherein the sum of said components preferably is 100 wt-%, relative to the total weight of the isomer mixture.

Preferred mixtures of 2-propylheptanol and isomers thereof are mixture comprising from 85 to 95 wt-% 2-propylheptanol, from 5 to 12 wt-% 2-propyl-4-methylhexanol, from 0.1 to 2.0 wt-% 2-propyl-5-methylhexanol and from 0.01 to 1.00 wt-% 2-isopropyl-heptanol, wherein the sum of said components preferably is 100 wt-%, relative to the total weight of the isomer mixture.

If said isomer propylheptanol-isomer mixtures are used instead of pure 2-propylheptanol for producing propylheptyl (meth-)acrylate monomers for copolymers of the present invention, the isomeric composition of the propylheptyl group that is esterified with methacrylic or acrylic acid is basically identical to the isomer composition of the propylheptanol-isomer mixture used in the esterification reaction.

Accordingly, the term "propylheptanol" as used herein includes 2-propylheptanol as well as constitutional isomers thereof as mentioned above. Likewise, the term "propylheptylarylate" as used herein includes acrylic acid esters of 2-propylheptanol as well as acrylic acid esters of constitutional of 2-propylheptanol as mentioned above. Analogously, the term and propylheptylmethacrylate" as used herein includes methacrylic acid esters of 2-propylheptanol as well as methacrylic acid esters of constitutional of 2-propylheptanol as mentioned above.

According to particular embodiments, monomer(s) (b) forming the copolymer of the invention is/are 2-propylheptanol ester(s) of acrylic and/or methacrylic acid.

According to further particular embodiments, monomer (b) forming the copolymer of the invention is propylheptylacrylate, preferably 2-propylheptylacrylate.

The copolymers of the present invention are formed from
(a) ethylene monomers;
(b) at least one monomers selected from propylheptylacrylate, propylheptylmethacrylate and mixtures of propylheptylacrylate and propylheptylmethacrylate;
and optionally (c) at least one further monomer that is different from (a) and (b).

Monomers (a), i.e. ethylene monomers, make up from 75 wt-% (i.e. percent by weight) to 98 wt-% relative to the total weight of monomers forming the copolymer of the invention. Preferably, the amount of monomers (a) is from 78 wt-% to 97 wt-%, more preferably from 79.0 wt-% to 96.5 wt-% and most preferably from about 80 wt-% to about 96 wt-% relative to the total weight of monomers forming the copolymer of the invention.

Monomers (a), i.e. ethylene monomers, and monomers (b), i.e. monomers selected from propylheptylacrylate, propylheptylmethacrylate and mixtures thereof, make up at least 90 wt-% relative to the total weight of monomers forming the copolymer of the invention. Preferably, the total amount of monomers (a) and (b) is at least 91 wt-%, more preferably at least 95 wt-%, at least 97 wt-% or at least 98 wt-%, and particularly at least 99 wt-% relative to the total weight of monomers forming the copolymer of the invention.

Copolymers of the invention which are formed essentially from monomers (a) and (b) are a particular group of embodiments of the present invention. The term "essentially" in this context means that the copolymers comprise not more than 5 wt-%, preferably not more than 3 wt-%, more preferably not more than 2 wt-% and especially not more than 1 wt-% components other than monomers (a) and (b). For instance, as a result of preparation, small proportions of a compound used as a regulator (chain transfer agent) may possibly be present.

Where the monomers forming the copolymer of the invention comprise monomers other than monomers (a) and (b), the amount by weight of said monomers (referred herein as monomers (c)) is smaller than the amount by weight of monomers (b).

Suitable monomers (c) include, but are not limited to, monomers of formula M1

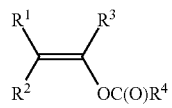

wherein
each of $R^1$, $R^2$ and $R^3$ is independently H or $C_1$-$C_4$-alkyl, preferably H or methyl, more preferably two of $R^1$, $R^2$ and $R^3$ are each H and the other is H or methyl, in particular $R^1$, $R^2$ and $R^3$ are each H; and
$R^4$ is $C_1$-$C_{20}$-alkyl, preferably $C_1$-$C_9$-alkyl, more preferably $C_1$-$C_3$-alkyl, specifically ethyl or methyl, and especially methyl;
monomers of formula M2 other than propylheptylacrylate and propylheptylmethacrylate,

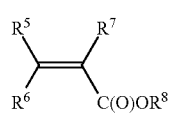

wherein
each of $R^5$, $R^6$ and $R^7$ is independently H or $C_1$-$C_4$-alkyl, preferably H or methyl, more preferably two of $R^5$, $R^6$ and $R^7$ are each H and the other is H or methyl, in particular $R^5$, $R^6$ and $R^7$ are each H; and
$R^9$ is $C_1$-$C_{20}$-alkyl, or is selected from straight-chain and branched alkyl groups having from 4 to 20, from 6 to 20, from 8 to 20 and in particular from 9 to 20 carbon atoms, with branched alkyl being preferred;
monomers of formula M3,

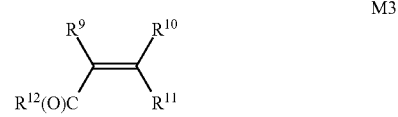

wherein
$R^9$ is independently H or $C_1$-$C_4$-alkyl, preferably H or methyl, and in particular H;
one of $R^{10}$ and $R^{11}$ is —C(O)$R^{13}$ and the other is H or $C_1$-$C_4$-alkyl; and
$R^{12}$ and $R^{13}$ are each independently —OH or $C_1$-$C_{20}$-alkoxy; or
$R^{12}$ and $R^{13}$ together from an —O— group.
and mixtures of two or more of such monomers.

Examples of monomers M1 include, but are not limited to, vinyl or propenyl esters of aliphatic $C_2$-$C_{20}$-carboxylic acids such as acetic acid, propionic acid, butyric acid, valeric acid, isovaleric acid, pivalic acid, neopentanoic acid, caproic acid, enanthic acid, caprylic acid, pelargonic acid, 2-ethylhexanoic acid, Versatic™ acids, especially neononanoic acid and neodecanoic acid (e.g. VeoVa™=vinyl ester of Versatic acid), capric acid, neoundecanoic acid, lauric acid, tridecanoic acid, myristic acid, pentadecanoic acid, palmitic acid, margaric acid, stearic acid, nonadecanoic acid and arachic acid. Preference is given to the vinyl esters of the carboxylic acids mentioned, with vinyl acetate being particularly preferred.

According to particular embodiments of the present invention, the copolymer is formed from monomers (a), (b) and M1, with monomer M1 being preferably vinyl acetate. According to more particular embodiments of the present invention, the copolymer is formed from ethylene monomers, propylheptyl monomers and vinyl acetate monomers.

Monomers M2 are preferably the esters of α,β-unsaturated carboxylic acids which are selected from acrylic acid ($R^5$, $R^6$ and $R^7$=H), methacrylic acid ($R^5$, $R^6$=H; $R^7$=methyl), crotonic acid ($R^6$, $R^7$=H; $R^5$=methyl) and isocrotonic acid ($R^5$, $R^7$=H; $R^6$=methyl), more preferably from acrylic acid and methacrylic acid and especially acrylic acid. Examples of monomers M2 include, but are not limited to, n-butyl acrylate, 2-butyl acrylate, isobutyl acrylate, tert-butyl acrylate, n-pentyl acrylate, neopentyl acrylate, isopentyl acrylate, hexyl acrylate, heptyl acrylate, octyl acrylate, 2-ethylhex-1-yl acrylate, nonyl acrylate, decyl acrylate, 2-propylhept-1-yl acrylate, 4-methyl-2-propylhex-1-yl acrylate, undecyl acrylate, lauryl acrylate, tridecyl acrylate, myristyl acrylate, palmityl acrylate, stearyl acrylate, nonadecyl acrylate and eicosyl acrylate; and also the corresponding esters of methacrylic, crotonic and isocrotonic acid, preference being given to the acrylates (esters of acrylic acid).

Monomers M3 are acid anhydrides of an ethylenically unsaturated aliphatic 1,2-dicarboxylic acid ($R^{12}$ and $R^{13}$ together form an —O— group), an ethylenically unsaturated aliphatic 1,2-dicarboxylic acid ($R^{12}$ and $R^{13}$=—OH), the monoester of an ethylenically unsaturated aliphatic 1,2-dicarboxylic acid of $C_1$-$C_{20}$-alcohols (one of $R^{12}$ and $R^{13}$=—OH and the is $C_1$-$C_{20}$-alkoxy), or the diester of an ethylenically unsaturated aliphatic 1,2-dicarboxylic acid of $C_1$-$C_{20}$-alcohols ($R^{12}$ and $R^{13}$=$C_1$-$C_{20}$-alkoxy). Preferably, $R^9$ and $R^{10}$ are H, or $R^9$ and $R^{11}$ are H. Accordingly, monomers M3 are preferably selected from maleic anhydride, maleic acid, fumaric acid, maleic mono- and diesters of $C_1$-$C_{20}$-alcohols, and fumaric mono- and diesters of $C_1$-$C_{20}$-alcohols. Examples of monomers M3 include, but are not limited to, monomethyl, monoethyl, monopropyl, monoisopropyl, mono-n-butyl, mono-sec-butyl, monoisobutyl, mono-tert-butyl, monopentyl, monohexyl, monoheptyl, monooctyl, mono-2-ethylhexyl, monononyl, monodecyl, mono-2-propylheptyl, mono-4-methyl-2-propylhexyl, monoundecyl, monododecyl, monotridecyl, monotetradecyl, monopentadecyl, monohexadecyl, monoheptadecyl, monooctadecyl, monononadecyl, monoeicosyl fumarates and maleates, as well as symmetrical and mixed fumaric and maleic diesters of the corresponding alcohols.

The copolymers of the invention are not graft copolymers and are not cross-linked. They can be straight-chained or branched, wherein copolymers having the typical branched structure resulting from high pressure polymerization (including short-chain branching due to CH2 radical to CH2 backbiting around a co-monomer unit) are preferred.

The copolymers of the present invention preferably have a number-average molecular weight $M_n$ in the range from about 1,000 to 4,800, more preferably from 1,500 to 4,500, and most preferably from 2,000 to 4,000 g/mol.

The copolymers of the present invention preferably have an $M_w/M_n$, ratio (=PDI) of from 1.5 to 5.0, preferably from 1.8 to 4.0 and especially from 1.9 to 3.5.

The details of weight-average molecular weights ($M_w$) number-average molecular weights ($M_n$) and their quotient PDI (=$M_w/M_n$) given in the context of the present invention are preferably based on values which have been determined by means of gel permeation chromatography (polystyrene standards).

The viscosity of copolymers of the present invention (as determined according to Ubbelohde DIN 51562) is typically in the range of from about 100 to about 3,000 mm$^2$/s, in particular from about 250 to about 2,750 mm$^2$/s, and especially from about 500 to about 2,500 mm$^2$/s, in each case at a temperature of 120° C.

Preparation of the Copolymers

The inventive polymers or polymers used in accordance with the invention are prepared by processes known per se, preferably by the processes known from prior art (cf., for example, *Ullmann's Encyclopedia of Industrial Chemistry* 5th Edition, under: Waxes, Vol. A 28, p. 146 ff., VCH Weinheim, Basle, Cambridge, N.Y., Tokyo, 1996; and also EP-A-157106, EP-A-244855, EP-A-0007590, U.S. Pat. No. 6,300,430, U.S. Pat. No. 3,627,838, DE-A-2515805, DE-A-3141507) for direct free-radical high-pressure copolymerization of unsaturated compounds.

The polymers are prepared preferably in stirred high-pressure autoclaves or, more preferably, in high-pressure tubular reactors or combinations of the two. In the autoclaves, the length/diameter ratio varies predominantly within ranges from 2:1 to 30:1, preferably from 5:1 to 20:1. The tubular reactors predominantly have a length/diameter ratio of >1,000, preferably from 5,000 to 30,000.

High pressure polymerization is typically carried out at pressures in the range of from 1,000 to 3,000 bar, preferably from 1,500 to 2,000 bar. Typically, the reaction temperatures are in the range of from 120 to 320° C., preferably from 140 to 280° C., and more preferably from 140 to 250° C.

The regulators used to adjust the molecular weight of the copolymers are, for example, selected from aliphatic aldehydes and aliphatic ketones of the general formula (I)

and mixtures thereof,
wherein $R^a$ and $R^b$ are the same or different, and are selected from:
hydrogen;
$C_1$-$C_6$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl; more preferably $C_1$-$C_4$-alkyl such as methyl, ethyl, n-propyl, isopropyl, n-butyl, isobutyl, sec-butyl and tert-butyl; and
$C_3$-$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;
or wherein $R^a$ and $R^b$ are covalently linked to one another so as to form a 4- to 13-membered ring. For example, $R^a$ and $R^b$ together an alkylene groups selected from —(CH$_2$)$_4$—, —(CH$_2$)$_5$—, —(CH$_2$)$_6$, —(CH$_2$)$_7$—, —CH(CH$_3$)—CH$_2$—CH$_2$—CH(CH$_3$)— and —CH(CH$_3$)—CH$_2$—CH$_2$—CH$_2$—CH(CH$_3$)—.

The use of propionaldehyde or ethyl methyl ketone as a regulator is very particularly preferred.

Further very suitable regulators are unbranched aliphatic hydrocarbons, for example propane, or branched aliphatic hydrocarbons with tertiary hydrogen atoms, for example isobutane, isopentane, isooctane or isododecane (2,2,4,6,6-pentamethylheptane). Additionally, further regulators such as olefins (e.g. propylene, butane, hexene), can be used.

Mixtures of the above regulators with hydrogen or hydrogen alone are also preferred. The amount of regulator(s) used corresponds to the amounts customary for high-pressure polymerization processes.

The starters used for the free-radical polymerization may be customary free-radical initiators, for example organic peroxides, oxygen or azo compounds. Mixtures of a plurality of free-radical initiators are also suitable. The free-radical initiators used can be, for example, one or more peroxides selected from the following commercially available substances:

didecanoyl peroxide, 2,5-dimethyl-2,5-di(2-ethylhexanoylperoxy)hexane, tert-amyl peroxy-2-ethylhexanoate, dibenzoyl peroxide, tert-butyl peroxy-2-ethylhexanoate, tert-butyl peroxydiethylacetate, tert-butyl peroxydiethylisobutyrate, 1,4-di(tert-butylperoxycarbo)cyclohexane as an isomer mixture, tert-butyl perisononanoate, 1,1-di(tert-butylperoxy)-3,3,5-trimethylcyclohexane, 1,1-di(tert-butylperoxy)cyclohexane, methyl isobutyl ketone peroxide, tert-butyl peroxyiso-propylcarbonate, 2,2-di(tert-butylperoxy) butane, tert-butyl peroxyacetate, tert-butyl peroxypivalate or tert-amyl peroxypivalate;

tert-butyl peroxybenzoate, di-tert-amyl peroxide, dicumyl peroxide, the isomeric di(tert-butylperoxyisopropyl) benzenes, 2,5-dimethyl-2,5-di-tert-butylperoxyhexane, tert-butyl cumyl peroxide, 2,5-dimethyl-2,5-di(tert-butylperoxy)hex-3-yne, di-tert-butyl peroxide, 1,3-diisopropyl monohydroperoxide, cumene hydroperoxide or tert-butyl hydroperoxide;

dimeric or trimeric ketone peroxides, e.g. as described in EP 0813550.

Particularly suitable peroxides are di-tert-butyl peroxide, tert-butyl peroxypivalate, tert-butyl peroxyisononanoate or tert-butyl peroxy-2-ethylhexanoate or mixtures thereof. An example of an azo compound is azobisisobutyronitrile "AIBN". The free-radical initiators are metered in amounts customary for polymerizations.

According to a preferred method, the inventive copolymers are prepared by passing the monomers (a) and (b) and, if desired, monomer(s) (c) (e.g. one or more than one of monomers M1, M2 and M3) individually or in a mixture, preferably continuously, in the presence of the regulator through a tubular reactor which is kept at a pressure in the range from about 1,500 to 2,000 bar (for example at about 1,700 bar) and at a temperature in the range from about 120 to 160° C. (for example at about 140° C.). As a result of the continuous addition of initiator, which is generally dissolved in a suitable solvent, for example isododecane, the temperature of the reaction mixture increases. The process conditions (in particular the rate of initiator addition) is controlled so as to keep the temperature in the reactor at the desired reaction temperature, for example at a temperature in a range of from 200 to 250° C. The polymer present in the effluent can be isolated in a conventional manner or recycled into the reactor together with unconverted reactants.

Modifications to this method are of course possible and can be undertaken by those skilled in the art without unacceptable effort. For example, the monomers and the regulator can be metered separately to the reaction mixture and/or the reaction temperature can be varied during the process, to name just a few exemplary modifications.

The copolymers of the invention comprise the monomeric units derived from monomers (a), monomers (b) and, if present, monomers (c) usually in essentially random distribution. Nevertheless, owing to different polymerization rates under the given polymerization conditions, according to the selection of the individual monomers, gradient copolymers can form. For instance, acrylates frequently polymerize more rapidly than vinyl acetate under the above-described reaction conditions, so as to give rise, for example, to copolymers in which the acrylate concentration decreases along the main polymer chain, while vinyl acetate and ethylene are distributed essentially uniformly over the chain.

High pressure polymerization enables the introduction of high amounts of polar monomers in the back bone of the polyethylene. Alternatively, middle pressure technology (typically 70 -300 bar) can be used for the polymerization, provided that a solvent is added to the reaction mixture during the polymerization process. The solvent can be, for example, a cosmetic oil. High pressure polymerization is preferred because no solvent addition to the monomer solution is required (excess supercritical ethylene in the reaction mixture can act as solvent).

Oil Solutions of the Copolymer

The copolymers of the present invention are soluble in oils and preferably used as additives of oils.

Expediently, the copolymers of the present invention are cosmetically acceptable and thus useful as additives for (in particular liquid) cosmetic formulations. The "cosmetically acceptable" means that the respective compound does not cause undesired reactions, such as for example skin irritation, when used in cosmetic formulations.

Preferably, the copolymers are used as additives of natural oils as used in cosmetic formulations such as, for example, vegetable oils, i.e. fatty acid esters which occur naturally in plants (typically in their oily fruits), usually in the form of triglycerides. Virtually all vegetable oils are suitable for cosmetic applications, with soybean oil, rapeseed oil and palm oil being the most commonly used. Other vegetable oils commonly used in cosmetics include argan oil, avocado oil, rose oil, sun flower oil, olive oil and coconut oil.

Such oil solutions of copolymers of the present invention are stable at room temperature (or higher temperature) for at least 1 h, and can be stable for more than 24 h at room temperature. A stable copolymer/oil solution remains homogenous and clear without any phase separation, particle formation or visible turbidity over the specified period of time (e.g. for more than 1 h or even more than 24 h at room temperature).

Natural oils usually contain alkyl chains and polar groups. Without wishing to be bound by theory, it is assumed that the presence of (meth-)acrylate derived monomeric units in copolymers consisting mostly of ethylene derived monomeric units reduces the crystallinity of the copolymers, and the presence of the branched side chains of the propylheptyl (meth-)acrylate derived monomeric units increases the solubility of the copolymers in the oil and results in the molecular interaction to be strong enough so as to allow solutions of copolymer of the invention in oil to be stable at room temperature (or higher temperature) for at least 1 h.

Use of the Copolymers in Cosmetic Formulations

Copolymer/oil solutions are described herein can be used in cosmetic formulations. They are particularly useful as additives for liquid cosmetic formulations and, preferably, for rinse-off cosmetic formulations such as, for example, body wash, shampoo and conditioner formulations. In those applications, the copolymers of the invention serve to increase the amount of oil which remains on the skin or hair after rinse off. In other words, the copolymers of the present invention can act as oil depositioning enhancers. Liquid cosmetic formulations with oil solutions as described herein, such as for example body wash and shampoo formulations, can be prepared by adding premixed copolymer/oil solutions to the liquid base formulations (such as a body wash or shampoo formulation), for example at a ratio of about 10 parts by weight copolymer/oil solution to about 90 parts by weight base formulation.

Typically, oil-supplemented liquid cosmetic formulations (such as body wash or shampoo formulations) containing copolymers of the present invention (added as a premix with the oil) are stable at 10-50° C. for at least 1 month, at last 3 months, or even 6 months and longer.

The copolymers of the invention can be used alone or in combination with conventional additives which also possess oil depositioning enhancing properties.

The copolymers of the present invention are expediently used in a quantitative proportion, based on the total amount of the oil solution, which exhibits an essentially sufficient oil depositioning enhancing effect in the final formulation. For example, the copolymers are used amounts of from 0.01 to 10.00 wt-%, preferably from 0.05 to 6.00 wt-%, more preferably from 0.1 to 3.0 wt-% , and specifically from 0.5 to 1.5 wt-%, based on the total weight of the formulation.

EXAMPLES

1) Preparation of Polymers

A total of 19 different polymers were prepared by high-pressure polymerization of the corresponding monomers at reaction temperatures of 210° C. to 240° C. and pressures of from 1,600 to 1,800 bar. The monomers and their amounts in the total weight of the resulting polymers are indicated in table 1.

Viscosity, number-average molecular weight and PDI ($=M_w/M_n$) of said polymers were determined (cf. table 1). Number-average molecular weight ($M_n$) and weight-average molecular weight ($M_w$) were determined by means of high-temperature gel permeation chromatography using the method described in ISO 16014-1:2003(E) and ISO 16014-4:2003(E):, the solvent 1,2,4-trichlorobenzene (TCB), a temperature of apparatus and solutions of 135° C. and as concentration detector a PolymerChar IR-4 infrared detector (suitable for use with TCB). Monodisperse polystyrene (PS) standards in the range from 580 g/mol up to 11,600,000 g/mol as well as hexadecane were used for molecular weight calibration. The obtained calibration curve was adapted to polyethylene (PE) by means of the Universal Calibration method according to ISO 16014-2:2003(E). Viscosity was determined according to Ubbelohde DIN 51562 at 120° C.

Additionally, the monomer content of the resulting polymers was determined by 1 H-NMR spectroscopy (data not shown) using a Bruker AV 501 device (tetrachlorethane, 373 K). Monomer contents were in each case lower than 1,000 ppm.

2) Oil Solutions

Mixtures of 10 wt-% polymer in soy bean oil were prepared and slowly heated under agitation. For each example, the minimum temperature, where a homogenous and clear solution without any phase separation, particle formation or visible turbidity was formed, was determined (cf. "Min. solution temperature in SBO" in table 2).

Further, the stability of said 10 wt-% polymer/oil solutions at room temperature was monitored (cf. "Stability of SBO solution" in table 2). The solutions were considered stable as long as they remained homogenous without any phase separation being visible.

3) Cosmetic Formulations

The premixed oils of example 2 (pre-heated at a temperature above the respective minimum solution temperature) were added continuously to a liquid body wash base formulation (composition cf. table 2) or a liquid shampoo base formulation (composition cf. table 3), respectively (each pre-heated to 80° C.), at a weight ratio of 10 parts oil solution to 90 parts base formulation.

TABLE 2

| Body wash base formulation | amount [g] |
| --- | --- |
| Distilled water | 68.81 |
| Sodium Tridecyl Ether Sulfate | 14.26 |
| Cocamidopropyl Betaine B | 9.23 |
| TDA 3-Ethoxylated Tridecyl Alcohol | 1.48 |
| Sodium Chloride | 4.75 |
| Guar Hydroxypropyltrimonium Chloride | 0.48 |

TABLE 1

| | Amounts of monomers [wt-%] | | | | | | Viscosity | $M_n$ | |
| --- | --- | --- | --- | --- | --- | --- | --- | --- | --- |
| Examples | E | PHA | PHMA | EHA | SA | VAC | [mm²/s at 120° C.] | [g/mol] | PDI |
| 1 | 96.0 | 4.0 | — | — | — | — | 1000 | 2994 | 2.9 |
| 2 | 90.4 | 9.6 | — | — | — | — | 1000 | 2936 | 2.9 |
| 3 | 86.2 | 13.8 | — | — | — | — | 1000 | 3267 | 2.9 |
| 4 | 80.0 | 20.0 | — | — | — | — | 1000 | 3100 | 3.0 |
| 5 | 81.8 | 9.6 | — | — | — | 8.6 | 1000 | 2813 | 3.0 |
| 6 | 90.0 | 7.0 | — | — | — | 3.0 | 1000 | 2850 | 2.8 |
| 7 | 90.0 | 7.0 | — | — | — | 3.0 | 2000 | 3970 | 3.2 |
| 8 | 85.0 | 10.0 | — | — | — | 5.0 | 1000 | 3000 | 2.7 |
| 9 | 85.0 | 10.0 | — | — | — | 5.0 | 2000 | 3990 | 3.2 |
| 10 | 86.0 | 14.0 | — | — | — | — | 3000 | 5000 | 3.5 |
| 11 | 86.0 | — | 14.0 | — | — | — | 1000 | 2678 | 2.8 |

| | Amounts of monomers [wt-%] | | | | | | Viscosity | $M_n$ | |
| --- | --- | --- | --- | --- | --- | --- | --- | --- | --- |
| Reference examples | E | | | | SA | VAC | [mm²/s at 120° C.] | [g/mol] | PDI |
| A | 100.0 | — | — | — | — | — | 1000 | 2500 | 3.2 |
| B | 94.4 | — | — | — | — | 5.6 | 1000 | 2934 | 2.9 |
| C | 90.0 | — | — | 10.0 | — | — | 1000 | 2450 | 3.1 |
| D | 85.0 | 5.0 | — | — | — | 10.0 | 1000 | 2780 | 2.9 |
| E | 85.0 | 5.0 | — | — | — | 10.0 | 2000 | 4050 | 3.2 |
| F | 70.0 | 30.0 | — | — | — | — | 1000 | 2560 | 3.0 |
| G | 60.0 | 40.0 | — | — | — | — | 1000 | 2679 | 2.9 |
| H | 90.0 | — | — | — | 10.0 | — | 1000 | 2760 | 3.2 |

Abbreviations of monomers:
E = ethylene
PHA = 2-propylheptyl acrylate
PHMA = 2-propylheptyl methacrylate
EHA = ethylhexyl acrylate
SA = stearyl acrylate
VAC = vinyl acetate TABLE 2-continued

| Body wash base formulation | amount [g] |
|---|---|
| Xanthan Gum | 0.22 |
| Acrylates/C10-30 Alkyl Acrylate Crosspolymer | 0.03 |
| Polyox WSR-301 | 0.10 |
| Citric Acid Anhydrous | 0.12 |
| Preservative | 0.52 |
| total | 100.00 |

TABLE 3

| Shampoo base formulation | amount [g] |
|---|---|
| Distilled water | 83.9 |
| Sodium Laureth Sulfate | 10.0 |
| Cocamidopropyl Betaine | 3.9 |
| Sodium Chloride | 1.5 |
| Guar Hydroxypropyltrimonium Chloride | 0.5 |
| Citric Acid | 0.1 |
| Preservative | 0.1 |
| total | 100.0 |

Said oil-supplemented liquid formulations were stored at 25° C. and their stability was monitored (cf. "Stability of body wash" and "Stability of shampoo" in table 4). The formulations were considered stable as long as they remained homogenous without any phase separation or bigger particle formation being visible.

Further, the oil depositing effect was assessed using the above-mentioned body wash formulations. The tester applied a defined amount of body wash formulation to his/her hands, rinsed the formulation off with water and then assigned a grade of oil depositioning by assessment of feel, with "x" referring to the virtual absence of a perceptible oil depositioning on the treated hands, "xx" referring to a perceptible oil depositioning up to medium level, and "xxx" referring to a strongly perceptible oil depositioning (cf. "Oil depositioning" in table 4).

TABLE 4

| | Min. solution temperature in SBO [° C.] | Stability of SBO solution [hours] | Stability of body wash [months] | Stability of shampoo [months] | Oil depositioning |
|---|---|---|---|---|---|
| Examples | | | | | |
| 1 | 100 | >24 | >6 | >6 | xxx |
| 2 | 95 | >24 | >6 | >6 | xxx |
| 3 | 90 | >24 | >6 | >6 | xxx |
| 4 | 85 | >24 | >6 | >6 | xxx |
| 5 | 95 | >24 | >6 | >6 | xxx |
| 6 | 105 | >24 | >6 | >6 | xxx |
| 7 | 105 | >24 | >6 | >6 | xxx |
| 8 | 100 | >24 | >6 | >6 | xxx |
| 9 | 100 | >24 | >6 | >6 | xxx |
| 10 | 100 | >24 | <6 | <3 | xx |
| 11 | 100 | >24 | >6 | >6 | xxx |
| Reference examples | | | | | |
| A | 115 | 1 | <0.2 | <0.1 | xxx |
| B | 115 | 22 | <1 | <0.5 | xxx |
| C | 105 | 24 | <4 | <4 | x |
| D | 100 | 24 | <4 | <4 | x |
| E | 100 | 20 | <4 | <4 | x |
| F | 80 | >24 | >6 | >6 | x |
| G | 75 | 20 | <4 | <4 | x |
| H | 110 | 2 | <1 | <1 | xx |
| I (no polymer) | — | >24 | >6 | >6 | x |

The exemplary copolymers of the invention 1-11 exhibited relatively low minimum solution temperatures when mixed with soy bean oil and formed oil solutions of high stability (>24 h). Additionally, said copolymers of examples 1-11 had a significant and, in all but one case, strong oil depositioning effect when used in rinse-off body wash formulations. The oil depositioning effects of reference examples A, B and H were also significant to strong. However, the corresponding oil solutions and cosmetic formulations were significantly less stable and the minimum solution temperatures in soy bean oil significantly higher than in case of examples 1-11. The other references examples did not show any significant oil depositioning effect, and in most cases also exhibited poor stability of the respective oil solutions and cosmetic formulations.

The invention claimed is:

1. A copolymer which is formed from monomers
   (a) ethylene,
   (b) at least one monomer selected from propylheptylacrylate, propylheptylmethacrylate, and mixtures thereof, and
   (c) optionally at least one further monomer different from (a) and (b),
   wherein
   (i) an amount of ethylene monomer (a) is in a range of from 75 wt-% to 98 wt-% relative to the total weight of monomers forming the copolymer;
   (ii) a total amount of monomers (a) plus (b) is at least 90 wt-% relative to the total weight of monomers forming the copolymer; and
   (iii) an amount by weight of monomer(s) (c), if present, is smaller than the amount by weight of monomer(s) (b).

2. The copolymer of claim 1, wherein the total amount of monomers (a) plus (b) is at least 95 wt-% relative to the total weight of monomers forming the copolymer.

3. The copolymer of claim 1 which is formed from monomers (a) and (b) only.

4. The copolymer of claim 1, wherein the amount of ethylene monomers (a) is in the range of from 78 wt-% to 97 wt-% relative to the total weight of monomers forming the copolymer.

5. The copolymer of claim 1, wherein monomer (b) is propylheptylacrylate.

6. The copolymer of claim 5, wherein monomer (b) is 2-propylheptylacrylate.

7. The copolymer of claim 1, wherein monomer(s) (c) is selected from monomers of formula M1

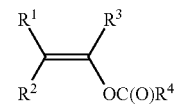

M1 wherein $R^1$, $R^2$ and $R^3$ are each independently H or $C_1$-$C_4$-alkyl; and $R^4$ is $C_1$-$C_{20}$-alkyl.

8. The copolymer of claim 7, wherein monomer (c) is vinylacetate.

9. The copolymer of claim 1 having a number-average molecular weight $M_n$ in the range of from 1,000 to 4,800 g/mol.

* * * * *